US005663110A

United States Patent [19]
Cowper

[11] Patent Number: 5,663,110
[45] Date of Patent: Sep. 2, 1997

[54] SOLUBLE SILICATE GLASS FORMS AND METHOD OF MANUFACTURING

[75] Inventor: William R. Cowper, West Chester, Pa.

[73] Assignee: PQ Corporation, Valley Forge, Pa.

[21] Appl. No.: 954,627

[22] Filed: Sep. 30, 1992

[51] Int. Cl.$^6$ .............................. C03C 3/76; C03C 3/076
[52] U.S. Cl. .................. 501/55; 428/542.8; 428/542.2
[58] Field of Search ................... 501/55; 428/542.8, 428/542.2

[56] References Cited

U.S. PATENT DOCUMENTS

| | | | |
|---|---|---|---|
| D. 225,844 | 1/1973 | Lazet | D16/1 |
| 3,769,509 | 10/1973 | Martone et al. | 250/71.55 |
| 3,811,853 | 5/1974 | Bartholomew et al. | 501/55 |
| 3,824,106 | 7/1974 | Adams et al. | 501/55 |
| 3,840,359 | 10/1974 | Lazet | 501/55 |
| 4,076,383 | 2/1978 | Heasley | 350/103 |
| 4,083,728 | 4/1978 | Orso et al. | 501/55 |
| 4,906,508 | 3/1990 | Blankenburg et al. | 428/116 |

OTHER PUBLICATIONS

"Increasing the Strength (of Glass) by Tempering," Handbook of Glass Manufacture, vol. II, 1974, Section 14, Article 12, pp. 801 and 819.

*Primary Examiner*—Melissa Bonner
*Attorney, Agent, or Firm*—Ernest G. Posner; Guy T. Donatiello

[57] ABSTRACT

A hexagonal pyramid shape silicate glass form having top and bottom surfaces wherein the distance between opposite corners at the bottom surface is in the range of 1 1/16 to 1 1/2". The slope of the pyramidal sides of the silicate glass form ranges from 23° to 30° off the vertical sloping from a larger bottom surface to a smaller top surface. The height of the silicate glass form is between 5/8" and 1 1/8". This form is very stable with a minimum of internal stresses. In this way, the dusting of the particle is reduced.

4 Claims, 6 Drawing Sheets

SOLUBLE SILICATE GLASS FORMS AND METHOD OF MANUFACTURING

FIELD OF THE INVENTION

The present invention relates to soluble silicate glass forms and more particularly to a soluble silicate glass form that is produced in a particular molded shape, so that upon cooling, the glass form becomes solidified in a state of temper. This glass form resists thermal breakage associated with non-annealed glass, and more importantly, resists mechanical breakage associated with non-tempered glass.

BACKGROUND OF THE INVENTION

Silicates, such as sodium and potassium silicates, are shipped in a glass form to end users desiring a liquid solution of silicate. The glass form is easy to manufacture and ship and can easily be dissolved to obtain the desired solution. For these reasons, the glass form is a desired way of delivering the silicate. In the past, molten silicate glass was poured into large trays, allowed to cool, and dumped into a hopper. The large glass pieces from the trays were fragile and would break and shatter, producing very fine particles (fines). The breakage and shattering could occur from the fall into the hopper, but would also occur spontaneously, due to internal stresses built up during the cooling of the untempered glass.

Once shattered, a glass dust forms which can adhere to the sides of the tank and equipment containing the dissolving solution. The adhered dust may not fully dissolve and can build up, clogging the dissolving equipment. Further, if the amount of dust is great, the minute size of the dust particles makes it difficult to handle. This difficulty in handling holds true for particle sizes of broken or shattered glass which may be slightly larger than dust size particles.

Forming a silicate glass form which does not easily thermally shatter or mechanically break will significantly reduce the amount of dust and particulate matter formed during the manufacture, storage and shipping of the silicate glass form to an end user. One way to reduce breakage or shattering is to temper the glass by rapid cooling in such a way that all surfaces of the glass form are under a high state of compression after the silicate glass form reaches room temperature. These compressive stresses are counterbalanced by tension in the central layers of the silicate glass form. A piece of silicate glass so tempered cannot be broken unless sufficient force is applied to overcome the compression of the surface and create tension or unless the tensile strength of the interior is exceeded. Maximum strength is then achieved by developing the highest compressive forces at the surfaces which will not cause the counterbalancing tension in the central layers to exceed the tensile strength of those layers. This rapid cooling, non-shattering concept is explained in Volume II of the *Handbook of Glass Manufacture*, Copyright 1974, Section 14, Article 12, "Increasing the Strength (of Glass) by Tempering".

However, the glass must be properly shaped to handle the external compressive and internal tensile forces. In the past, several different approaches have been tried which consisted mainly of the manufacture of square (four sided) pyramids between 1½" and 3" on a side. However, these pyramids nevertheless develop internal stresses, concentrated mainly at the corners, which leads to a significant chance of breakage. Occasionally, such a pyramid will explode spontaneously without first being exposed to any external disturbance, due to these internal stresses. As a result, a large amount of fines (very small particles which tend to clog the silicate dissolving machinery) occur as a result of producing glass by this method. Therefore, there is a need to produce silicate glass without producing fines.

SUMMARY OF THE INVENTION

The present invention comprises a soluble silicate glass formed in a substantially truncated hexagonal (six sided) pyramid shape having a top surface in the form of a regular hexagon and a larger bottom surface also in the form of a regular hexagon. The distance between opposite corners at the bottom surface is in the range of 1¹/₁₆" to 1½". The slope of the pyramidal sides of the silicate glass form is in the range of 23 to 30 degrees from the vertical. The height of the pyramidal silicate glass form from bottom surface (base) to top surface (apex) is in the range of ⅝" to 1⅛". These characteristics allow an easily manufactured silicate glass form having the desired shatterproof properties.

The process used in manufacturing the exemplary soluble silicate glass form involves pouring molten silicate glass into a plurality of molding trays which ride along a conveyer belt or chain. The molten glass is leveled to fill the molding tray and produce the desired truncated hexagonal pyramid glass form. The molten glass may be scored and then undergoes a cooling process. The final silicate glass forms are ejected from the tray whereupon the empty tray is then further cooled prior to being refilled with molten glass.

BRIEF DESCRIPTION OF THE FIGURES

The invention will now be described by way of non-limiting example, with reference to the attached drawings in which.

DETAILED DESCRIPTION OF THE INVENTION

Figure 1:
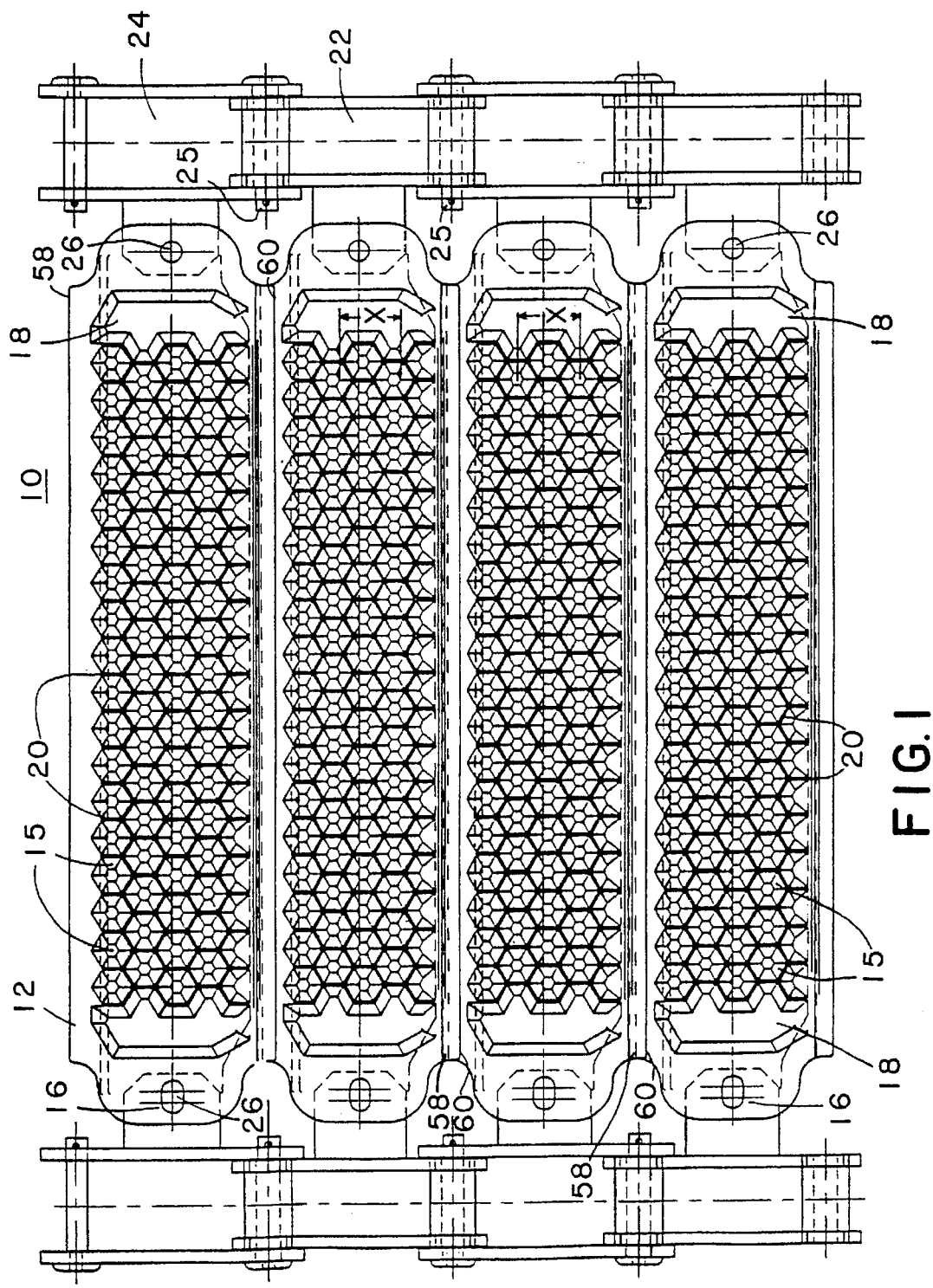
FIG. 1 is a plan view of an exemplary embodiment of the molding trays for hexagonal pyramid silicate glass forms.

There is shown in FIG. 1 a series of molding trays 12 which are illustrative of the present invention. Molding trays 12 are mounted so that they interlock and form a conveyor belt 10 of molding trays 12. Molding trays 12 are attached to a chain 22 having links 25 which form spaces 24 between each pair of links 25. Molding trays 12 are attached to chain 22 at connection point 16 via a fastener 26. Connection point 16 may be a hole through which a nut and bolt (not shown) is attached to fastener 26. Other methods of fastening molding trays to chain 22 or other drive mechanisms will be understood by those skilled in the art. Molding trays 12 are interconnected to one another at lower edge 58 and upper edge 60. The interconnection of molding trays 12 will be more fully described by way of FIG. 5 herein.

Molding trays 12 have a plurality of indentations (or individual molds) 15 shaped in truncated hexagonal pyramids. The apex of each such pyramid is at the lower surface of indentation 15 so that the hexagonal pyramid shape of indentation 15 appears "upside down". The base or bottom of each pyramid is at the upper opening of mold 15, and forms the bottom of glass form 14. These hexagonal pyramid molds 15 are filled with molten silicate glass which when cooled and ejected from each mold 15 of molding trays 12 forms an individual silicate glass form 14 having a truncated hexagonal pyramid shape which is substantially break resistant and shatterproof. Because the hexagonal pyramid glass form 14 is molded upside down, the bottom surface 30 (FIG. 2) of the glass form is at the upper opening of mold 15.

The hexagonal shape is used for several reasons. In minimizing the internal stresses, it is desirable to have a greater angle between adjacent sides of the finished glass shape. In a square pyramid, the internal angle between adjacent sides of the pyramid is 90°. In a hexagonal pyramid, the internal angle between adjacent sides is 120°. Furthermore, hexagons can be close packed to completely cover a planar surface. Thus, this shape maximizes the use of the area on the molding tray, producing a maximum number of soluble silicate glass forms per molding tray 12. As is readily seen in FIG. 1, the gaps 20 between each hexagonal pyramid mold 15 are very small, but have a slight width due to a desire to avoid making the walls between molds 15 too thin and fragile.

Molten silicate glass is poured onto molding trays 12, filling the molds 15 and then rolled flat. Excess silicate glass is rolled into overflow space 18 while still in a substantially molten state. The rolling produces a substantially flat base, because the hexagonal pyramid silicate glass forms are molded upside down with apex (or top surface) of the pyramid being poured first. The excess material, filling gaps 20 between the hexagonal pyramid silicate glass forms 14, is referred to as flash.

Figure 3:
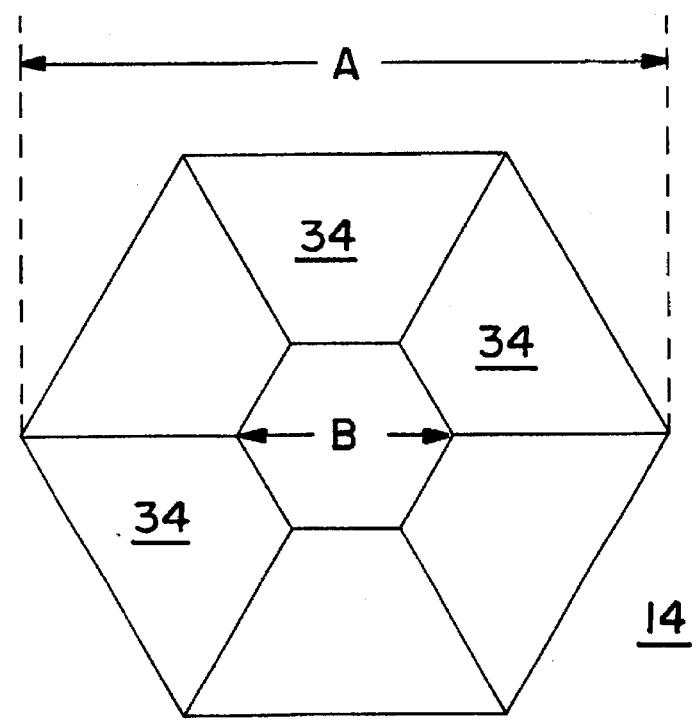
FIG. 3 is a plan view of an exemplary hexagonal pyramid silicate glass form.
Figure 2:
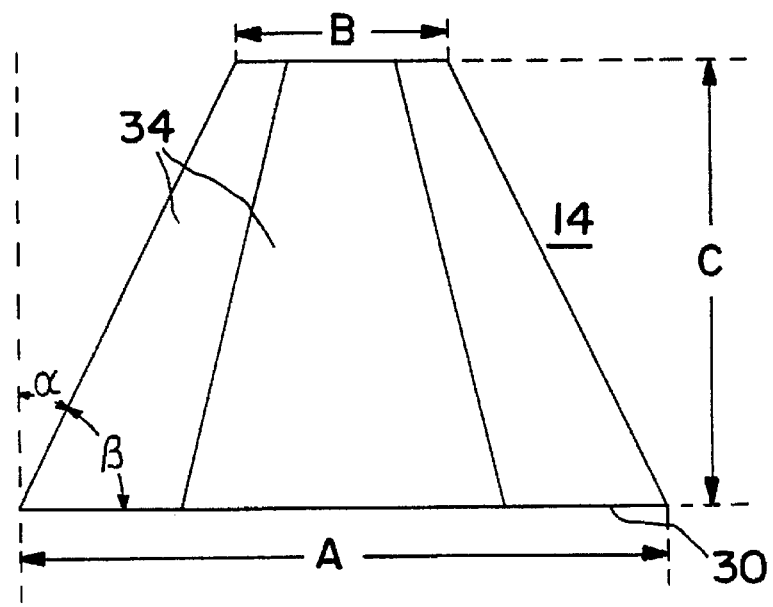
FIG. 2 is a side view of an exemplary hexagonal pyramid silicate glass form.

There is shown in FIG. 2 a side view of a hexagonal pyramid silicate glass form 14 which is exemplary of the present invention. FIG. 3 shows a plan view of the same exemplary glass form 14. Hexagonal pyramid silicate glass form 14 has a base or bottom surface of dimension A measured between opposite corners of the hexagon. A dimension A of 1 1/16" to 1 1/2" has been found to produce soluble silicate glass forms having substantially break resistant and shatterproof qualities. The top surface or apex of the hexagonal pyramid is shown as dimension B. Dimension B is also measured between opposite corners of the hexagon, but at the top surface of the hexagonal pyramid. Dimension B is generally about 1/2", but is determined by dimension A, the slope α of the sides of the pyramid, and dimension C (the height of the pyramid).

Hexagonal pyramid silicate glass form 14 has a height from bottom surface to top surface of dimension C. A dimension C of between 5/8" and 1 1/8" combined with the dimensions for A, B and angle α has proven to produce silicate glass forms having the desired substantially shatterproof quality.

The side walls 34 of the pyramid have a slope (angle) α in the range of 23° to 30° from the vertical axis. This leaves a corresponding angle β measured from the horizontal axis in the range of 60° to 67°. This angle is important not only for shatterproof properties, but also to allow the shape to be easily removed from the molding tray.

Figure 4:
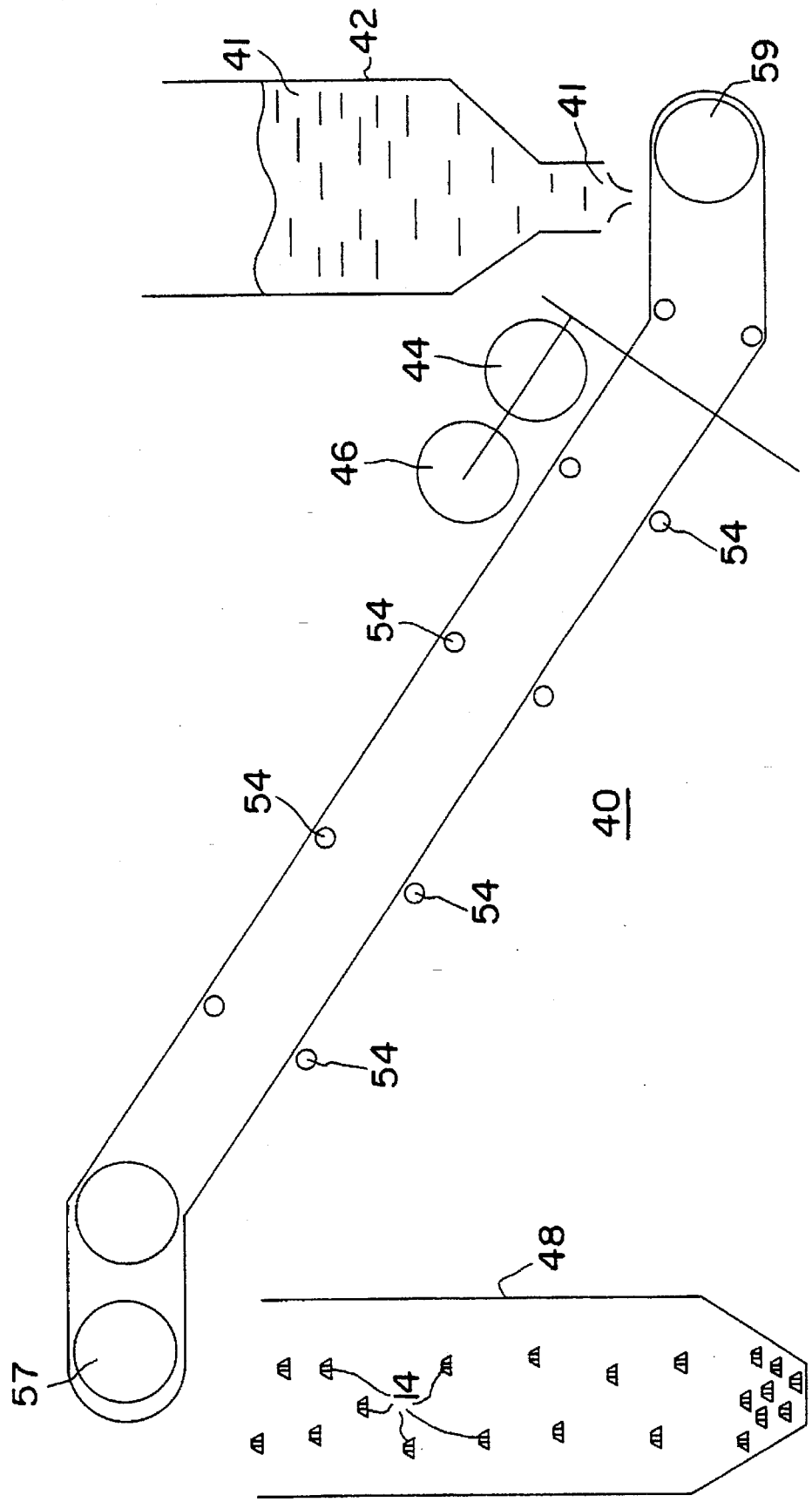
FIG. 4 is a diagram of an exemplary manufacturing process for making a hexagonal pyramid silicate glass form.

There is shown in FIG. 4 an example of a manufacturing process 40 for manufacturing hexagonal pyramid silicate glass forms 14. A conveyor belt 10 of molding trays 12 is shown circling a plurality of rollers 54. Rollers 54 may vary in size and position as understood by those skilled in the art. Molten glass 41 is poured from a furnace and/or necessary delivery equipment 42 onto the conveyor belt of molding trays 10. Each individual molding tray 12 shown in FIG. 1 passes under leveling roller 44. Leveling roller 44 has a substantially smooth leveling surface and evenly distributes the molten silicate glass into all of the molds 15, pushing the excess into space 18. At this point, the molten glass begins to cool, becoming more and more viscous.

Individual molding trays 12 of molds 15, which contain the molten silicate glass 41 cool as they move along the conveyor belt of molding trays 10.

As molten glass 41 cools in the individual molds 15, the resulting hexagonal pyramid silicate glass form shrinks slightly as a part of the cooling process. Once the glass is sufficiently cool, it can be removed from tray 12. The slope of the sides of the pyramid silicate glass form allows the silicate glass form 14 to fall out of each mold 15 of each molding tray 12 when each molding tray 12 is in an upside down position after circling end sprockets 57 of the conveyor chain near hopper 48 or other suitable collection means, providing the glass has cooled. Hopper 48 can then be emptied into whatever type of packaging, container or distribution means is used to ship the silicate glass forms 14.

The glass forms 14 and trays 12 may be agitated, such as by being struck with a hammers(not shown) on the reverse side of trays 12 so as to loosen and release forms 14. Molding trays 12 then circle back upside down for the return trip to furnace 42.

As empty molding trays 12 circle back towards furnace 42, molding trays 12 further cool prior to being once again filled with molten silicate glass 41. The trays, both on the return trip (when they are empty) and between the furnace and the hopper (when they are full) should be cooled. If the conveyor 10 is long enough, the trays will cool due to ambient air temperature. The trays may also be cooled by forced cool air or water. It desirable for the molding tray temperature to be low, preferably below 450° F. prior to being filled with molten silicate glass 41. This provides some instantaneous cooling and shrinking of molten silicate glass 41 as it fills each mold 15 in molding trays 12.

Figure 5:
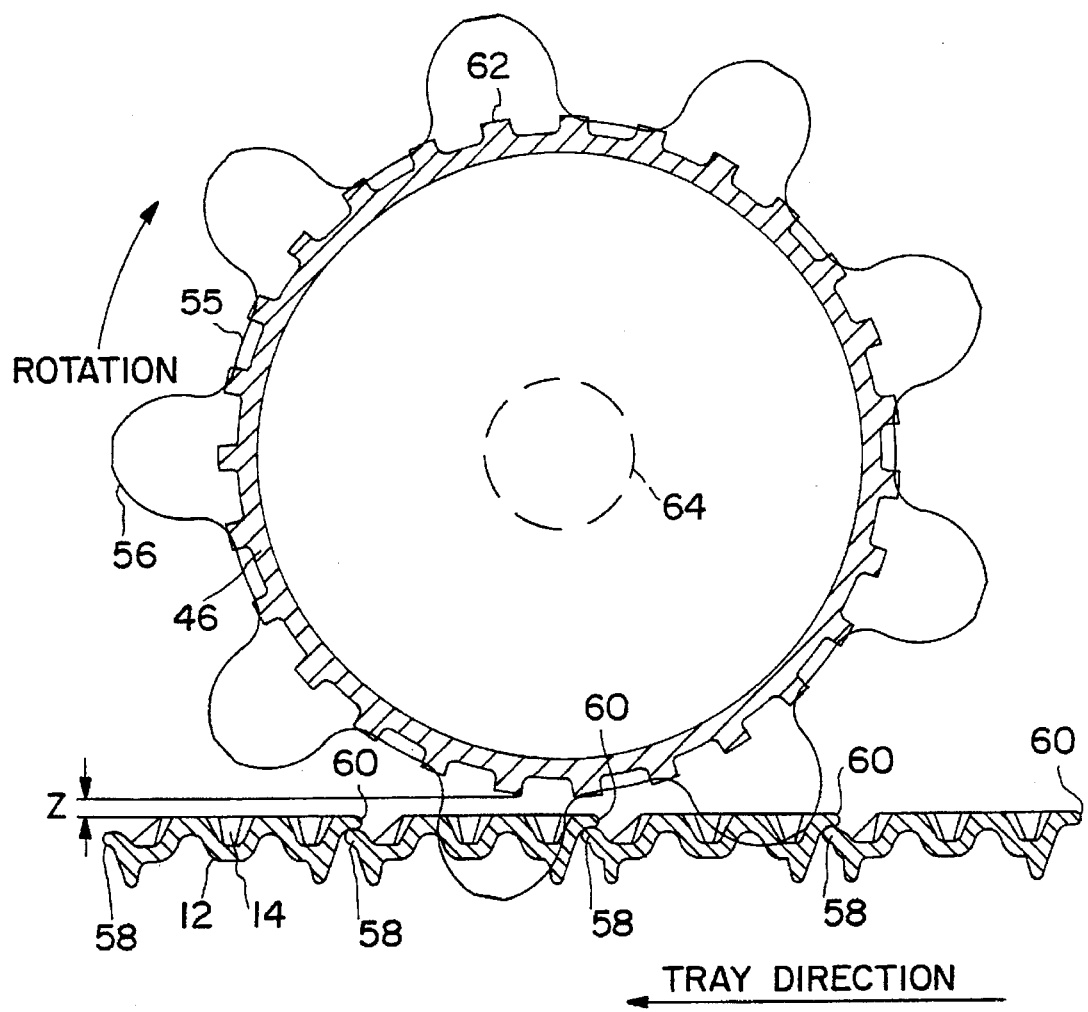
FIG. 5 is a cross-sectional side view of a scoring roller of the present invention with indexed sprocket interlockeded with the conveyor belt of molding trays, taken along line 5—5 of FIG. 7.
Figure 6:
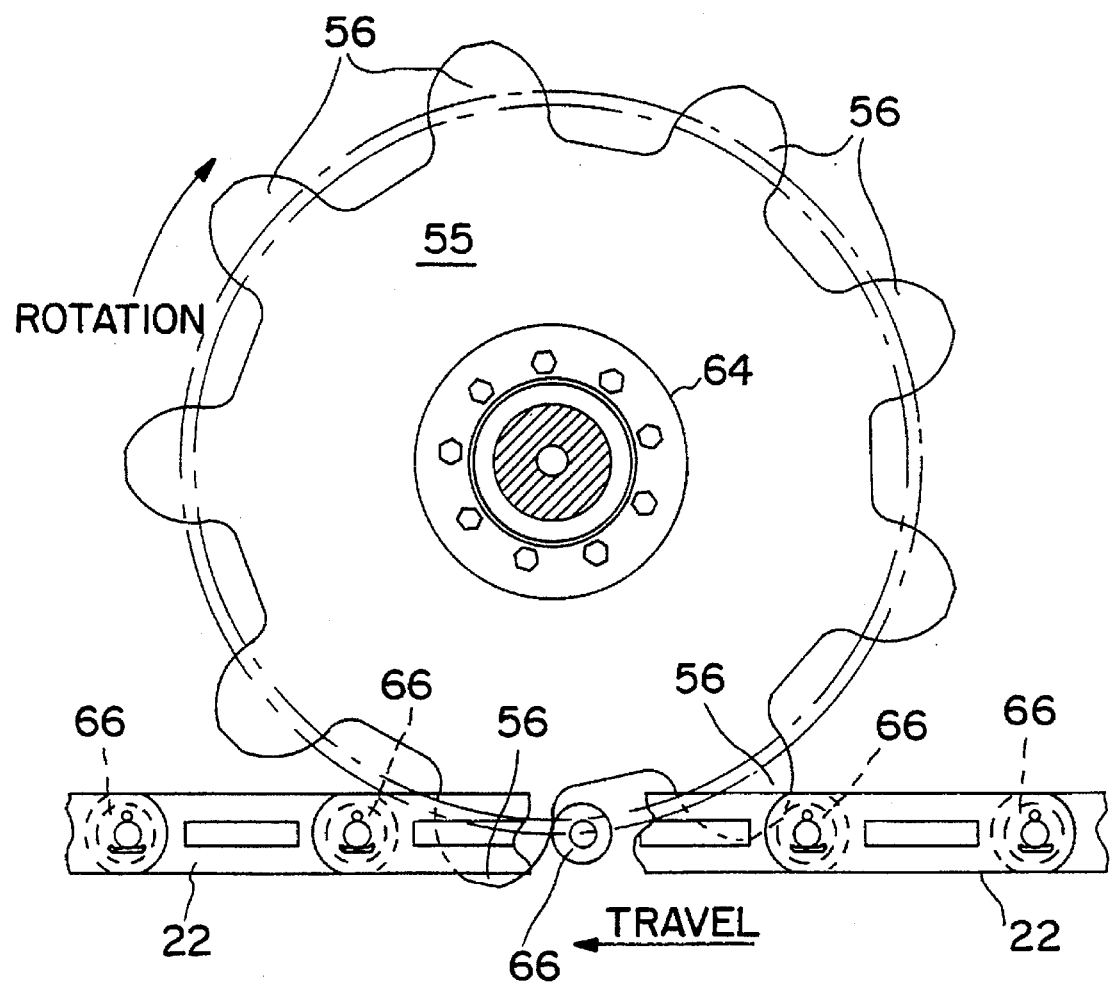
FIG. 6 is a cross-sectional side view of a scoring roller of the present invention with indexed sprocket interlocked with a chain holding molding trays, taken along line 6—6 of FIG. 7.
Figure 7:
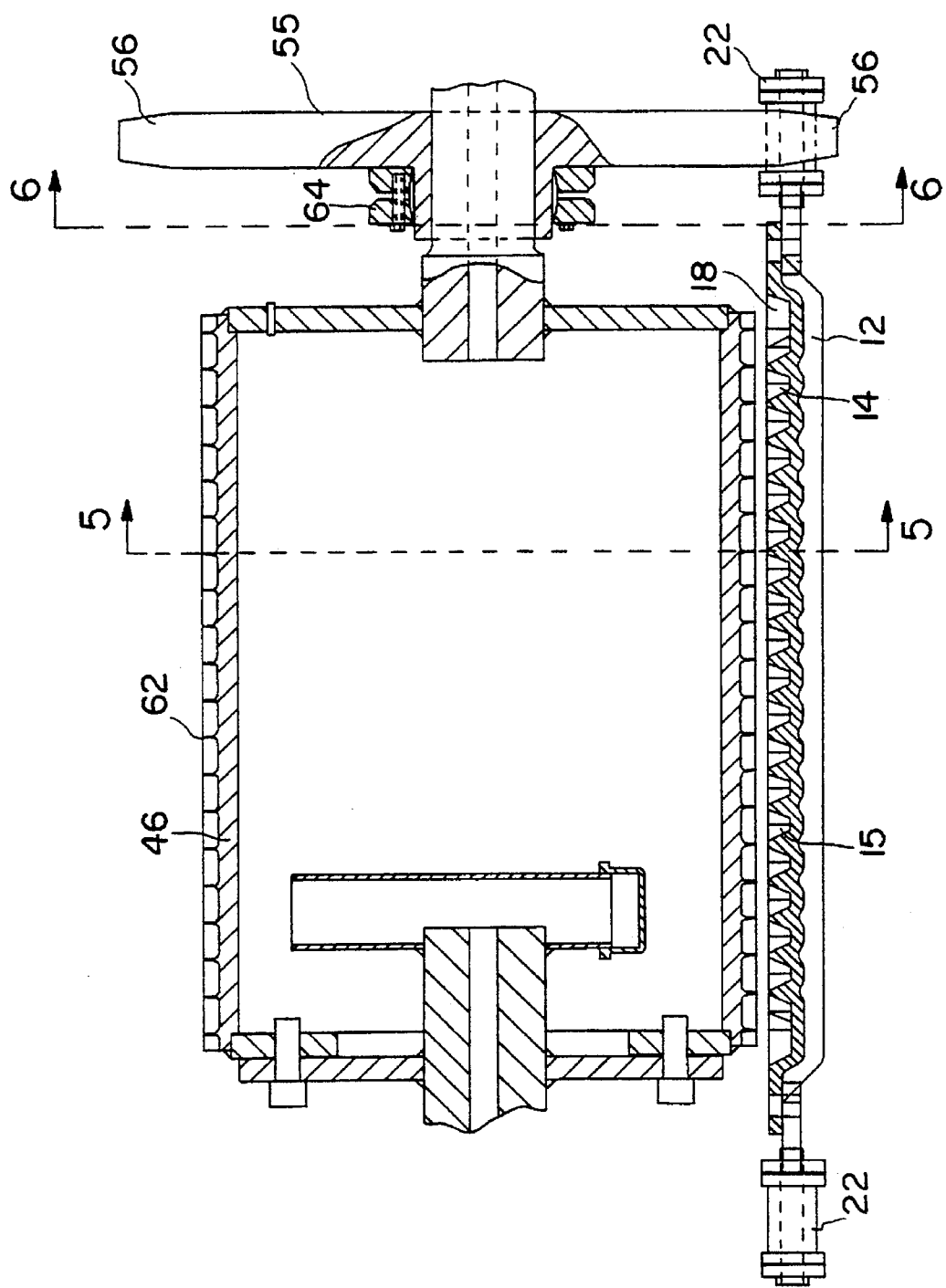
FIG. 7 is a cross-sectional view of a scoring roller of the present invention including indexed sprocket, molding trays and chain.

There is shown in FIG. 5 a cross-sectional side view of a scoring roller 46 with sprocket wheel 55. FIG. 6 shows a side view of scoring roller 46 interacting with chain 22. FIG. 7 shows a cross-sectional view of scoring roller 46 along with molding trays 12. The scoring roller is patterned with hexagonally shaped holes which match exactly the size of the hexagonal molds 15 on tray 12. The walls between the hexagonal holes are angled at about 20° between holes, and the holes are about 1/2" deep. The 20° angle allows sufficient steel (or other metal) between holes to ensure that the roller does not lose its tempering due to overheating from contacting the hot glass.

The scoring roller is not necessary, but it helps to decrease the fines which inadvertently result from the molding process. The scoring roller pattern scores the glass so that individual hexagonal pyramid silicate glass forms 14 are produced, as opposed to one continuous glass form per molding tray. This scoring is accomplished with a scoring surface 62 matching the pattern of shapes of each mold 15 in molding trays 12. Roller 46 passes close to trays 12, at a distance Z as shown in FIG. 5. This distance is adjustable, and leaves a predetermined amount of material between hexagonal glass forms 14. This aids in removability and separability of the forms. To allow for this adjustability, sprocket wheel 55 is a double pitch wheel. Sprocket teeth 56 on scoring roller 46 interact with chain barrels 66 (which surround chain links 25) on chain 22 to time the scoring so that roller 46 lines up nearly exactly with the pattern of hexagonal shapes of molding trays 12. The scoring occurs near the top opening of molding trays 12, corresponding to the bottom surface 30 of each individual hexagonal pyramid shape glass form 14.

As previously mentioned, scoring surface 62 should match exactly the pattern in 12. Accordingly, play is built in between sprocket teeth 56 and chain barrels 66. The primary function of chain barrels 66 is to synchronize roller 46, not necessarily to drive roller 46 since friction between the glass and roller 46 is the primary mover of roller 46. Sprocket teeth 56 will gravitate toward one or the other end of the space between chain barrels 66. Therefore, the space between adjacent chain barrels 66 minus the width of one sprocket tooth 56 should be equal to the distance from one point on a hexagonal pyramid mold 15 to the same point on the next hexagonal pyramid mold 15 (e.g. centers of the hexagonal pyramid molds), shown as distance X in FIG. 1. Thus, the roller 46 will be synchronized in whichever position it occupies.

The interlocking mechanism of trays 12 to form the conveyor belt of molding trays 10 is also shown in FIG. 5. The interlocking of upper edges 60 with lower edges 58 provides an allowance for chain expansion which will occur over time, as well as allowing movement around sprocket wheels 57 and 59. Further, these interlocking edges seal the spaces between trays so that molten glass does not fall through the conveyor belt, where it would be wasted and difficult to recover.

A Ringfeder™ 64 is used on scoring roller 46 to lock scoring roller 46 to sprocket wheel 55. Ringfeder™ 64 allows adjustment of scoring roller 46 so that it can be synchronized with the movement of molding trays 12. In the present embodiment, scoring roller 46 has a 17 3/16" diameter (54" circumference). With a tray width of 6", scoring roller 46 will score exactly nine molding trays 12 in one revolution. Those skilled in the art will understand that different dimensions may be used to achieve the same results.

Those skilled in the art will also understand that silicate glasses other than sodium silicate glass can be formed into the hexagonal pyramid shapes described above by way of the above described process. Other such silicate glasses may include potassium silicate glass, for example. Accordingly, those skilled in the art will recognize that this invention is not limited to the embodiments and applications disclosed.

What is claimed:

1. A soluble silicate glass structure resistant to mechanical breakage formed in a substantially truncated hexagonal pyramid shape having a hexagonal bottom surface, a hexagonal top surface having a smaller surface area than said bottom surface and six sides, said sides having a slope from said bottom surface to said top surface, and said bottom surface having a distance between opposite corners in the range of 1 1/16" to 1 1/2".

2. The soluble silicate glass structure resistant to mechanical breakage of claim 1 wherein said slope of said sides from said bottom surface to said top surface is in the range of 23 degrees to 30 degrees measured from an axis perpendicular to said bottom surface.

3. The soluble silicate glass structure resistant to mechanical breakage of claim 1 wherein the height of said soluble silicate glass from said bottom surface to said top surface is in the range of 5/8" to 1 1/8".

4. A soluble silicate glass structure resistant to mechanical breakage formed in a substantially truncated hexagonal pyramid shape having a hexagonal bottom surface, a hexagonal top surface having a smaller surface area than said bottom surface and six sides, said sides having a slope from said bottom surface to said top surface and wherein said bottom surface has a distance between opposite corners in the range of 1 1/16" to 1 1/2", said slope of said sides from said bottom surface to said top surface is in the range of 23 degrees to 30 degrees measured from an axis perpendicular to said bottom surface and the height of said soluble silicate glass from said bottom surface to said top surface is in the range of 5/8" to 1 1/8".

* * * * *